(12) United States Patent
Gokhale

(10) Patent No.: US 9,120,489 B2
(45) Date of Patent: Sep. 1, 2015

(54) SYSTEMS AND METHODS FOR AN ENGINE

(75) Inventor: Manoj Gokhale, Bangalore (IN)

(73) Assignee: General Electric Company, Schenectady, NY (US)

( * ) Notice: Subject to any disclaimer, the term of this patent is extended or adjusted under 35 U.S.C. 154(b) by 1125 days.

(21) Appl. No.: 13/152,361

(22) Filed: Jun. 3, 2011

(65) Prior Publication Data
US 2012/0304887 A1  Dec. 6, 2012

(51) Int. Cl.
*F01N 3/031*   (2006.01)
*B61C 5/04*    (2006.01)
(Continued)

(52) U.S. Cl.
CPC ... *B61C 5/04* (2013.01); *F01N 3/00* (2013.01); *F01N 3/021* (2013.01); *F01N 3/10* (2013.01); *F01N 3/103* (2013.01); *F01N 3/2053* (2013.01); *F02B 37/00* (2013.01); *F02B 37/12* (2013.01); *F02B 37/20* (2013.01); *F02B 39/16* (2013.01); *F02D 41/0007* (2013.01); *F02D 41/0055* (2013.01); *F02D 41/0235* (2013.01); *F02D 41/10* (2013.01); *F02M 25/0707* (2013.01); *F02M 25/0749* (2013.01); *F01N 2410/00* (2013.01); *F01N 2410/10* (2013.01); *F02B 37/013* (2013.01); *F02D 13/0269* (2013.01); *F02D 2041/0265* (2013.01); *F02D 2200/0414* (2013.01); *F02D 2200/602* (2013.01); *Y02T 10/142* (2013.01); *Y02T 10/144* (2013.01); *Y02T 10/20* (2013.01); *Y02T 10/47* (2013.01)

(58) Field of Classification Search
CPC ... B61C 5/04; F01N 2410/00; F01N 2410/10; F02D 41/10; F02D 41/0235; F02D 41/0055; F02D 41/0007; F02M 25/07; F02M 25/0707

USPC ............................................ 60/602; 105/62.1
See application file for complete search history.

(56) References Cited

U.S. PATENT DOCUMENTS 4,107,921 A * 8/1978 Iizuka ............................ 60/288
4,217,757 A * 8/1980 Crone, Jr. ...................... 60/288
(Continued)

FOREIGN PATENT DOCUMENTS

EP   2123877 A1   11/2009
GB   2462798 A    2/2010
(Continued)

OTHER PUBLICATIONS

PCT Search Report and Written Opinion issued in connection with corresponding Application No. PCT/US2012/040424 on Mar. 3, 2014.
(Continued)

*Primary Examiner* — Thomas Moulis
*Assistant Examiner* — Arnold Castro
(74) *Attorney, Agent, or Firm* — GE Global Patent Operation; John A. Kramer (57) ABSTRACT

Various methods and systems for an engine are provided. In one example, an engine system includes an exhaust passage through which exhaust gas is configured to flow from the engine, and a turbocharger with a turbine positioned in the exhaust passage. The engine system further includes an exhaust gas treatment system disposed in the exhaust passage upstream of the turbine, the exhaust gas treatment system including at least one exhaust gas treatment device and a bypass with a bypass valve, the bypass valve configured to be adjusted to reduce exhaust gas flow through the exhaust gas treatment system in response to a transient engine operating condition.

21 Claims, 5 Drawing Sheets

(51) Int. Cl.

| | |
|---|---|
| *F01N 3/10* | (2006.01) |
| *F01N 3/021* | (2006.01) |
| *F02B 37/00* | (2006.01) |
| *F02B 37/12* | (2006.01) |
| *F02B 37/20* | (2006.01) |
| *F02B 39/16* | (2006.01) |
| *F01N 3/00* | (2006.01) |
| *F01N 3/20* | (2006.01) |
| *F02D 41/02* | (2006.01) |
| *F02D 41/00* | (2006.01) |
| *F02D 41/10* | (2006.01) |
| *F01N 9/00* | (2006.01) |
| *F02M 25/07* | (2006.01) |
| *F02B 37/013* | (2006.01) |
| *F02D 13/02* | (2006.01) |

(56) References Cited

U.S. PATENT DOCUMENTS

| | | | |
|---|---|---|---|
| 6,422,008 B2 | 7/2002 | Voss et al. | |
| 6,508,237 B2 * | 1/2003 | Romzek et al. | 123/568.21 |
| 6,698,409 B1 * | 3/2004 | Kennedy et al. | 123/568.21 |
| 7,047,953 B2 * | 5/2006 | Kennedy | 123/568.11 |
| 7,281,518 B1 * | 10/2007 | Allain et al. | 123/434 |
| 8,276,366 B2 * | 10/2012 | Bennet et al. | 60/280 |
| 8,484,969 B2 * | 7/2013 | Shiomi et al. | 60/605.2 |
| 8,726,640 B2 * | 5/2014 | Tilinski et al. | 60/286 |
| 2001/0049936 A1 | 12/2001 | Kenneth et al. | |
| 2004/0182372 A1 | 9/2004 | Kennedy | |
| 2005/0103013 A1 * | 5/2005 | Brookshire et al. | 60/605.2 |
| 2006/0016188 A1 * | 1/2006 | Kennedy | 60/605.2 |
| 2009/0165458 A1 * | 7/2009 | Matthews | 60/600 |
| 2010/0024399 A1 * | 2/2010 | Demura | 60/285 |
| 2010/0199665 A1 * | 8/2010 | Kapus | 60/602 |
| 2011/0213539 A1 * | 9/2011 | Eiraku | 701/102 |
| 2012/0186268 A1 * | 7/2012 | Rofka et al. | 60/783 |
| 2013/0055711 A1 * | 3/2013 | Hofer et al. | 60/602 |
| 2013/0067887 A1 * | 3/2013 | Heverley, III et al. | 60/273 |
| 2013/0074492 A1 * | 3/2013 | Chi et al. | 60/602 |

FOREIGN PATENT DOCUMENTS

| | | |
|---|---|---|
| JP | 2005171932 A | 6/2005 |
| WO | 9740266 A2 | 10/1997 |

OTHER PUBLICATIONS

Maxime Pasquier and Giles Monnet. "Diesel Hybridization and Emissions." US Department of Energy Report, 2004.

Hans Bode. Materials Aspects in Automotive Catalytic Converters. Google eBook. 2002.

Lifeng Xu, Robert W. McCabe, and Robert H. Hammerle. "Nox Self-Inhibition in Selective Catalytic Reduction wih Urea (Ammonia) Over a Cuzeolite Catalyst in Diesel Exhaust." Science Direct. 2002.

* cited by examiner

SYSTEMS AND METHODS FOR AN ENGINE

FIELD

Embodiments of the subject matter disclosed herein relate to systems and methods for an engine with an exhaust gas treatment device.

BACKGROUND

During operation, internal combustion engines generate various combustion by-products that are emitted from the engine in an exhaust stream. As such, various approaches may be utilized in order to reduce regulated emissions. In some examples, nitrogen oxide ($NO_x$) emissions may be reduced by employing exhaust gas recirculation (EGR), carrying out combustion in the engine with a Miller cycle, and/or including an exhaust gas treatment system with a device such as a $NO_x$ trap in an exhaust passage of the engine.

In other examples, the inventors herein have recognized the exhaust gas treatment system may include devices such as a diesel oxidation catalyst (DOC) and a particulate oxidation catalyst (POC) to reduce particulate matter emissions. However, when the exhaust gas treatment system including the DOC and POC is positioned downstream of a turbocharger, specific fuel consumption may be increased resulting in decreased fuel efficiency. On the other hand, when the exhaust gas treatment system including the DOC and POC is positioned upstream of a turbocharger, a transient response time of the engine may be increased during engine loading, as a portion of exhaust thermal energy is absorbed by the exhaust gas treatment system before the exhaust gas flow reaches the turbocharger.

BRIEF DESCRIPTION

In one embodiment, a system for an engine includes an exhaust passage through which exhaust gas is configured to flow from the engine, and a turbocharger with a turbine positioned in the exhaust passage. The system further includes an exhaust gas treatment system disposed in the exhaust passage upstream of the turbine, the exhaust gas treatment system including at least one exhaust gas treatment device and a bypass with a bypass valve, the bypass valve configured to be adjusted to reduce exhaust gas flow through the exhaust gas treatment system in response to a transient engine operating condition. By including a valved bypass around the exhaust gas treatment device, exhaust gas flow through the exhaust gas treatment device may be reduced during transient conditions by opening the valve. As such, the exhaust gas flow may bypass the exhaust gas treatment device resulting in a decrease of thermal energy absorbed by the exhaust gas treatment device, and an increase of thermal energy available for the turbocharger. In this manner, the turbocharger may produce a greater amount of boost, which may result in a decrease in transient response time. Further, because the exhaust gas treatment device is positioned upstream of the turbocharger, specific fuel consumption may be maintained.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

The following description relates to various embodiments of methods and systems for controlling emissions from an engine. In one example embodiment, a system for an engine includes an exhaust passage through which exhaust gas flows from the engine, a turbocharger with a turbine positioned in the exhaust passage, and an exhaust gas treatment system disposed in the exhaust passage upstream of the turbocharger, the exhaust gas treatment system including a diesel oxidation catalyst and a particulate oxidation catalyst and a bypass with a bypass valve. The system further includes a controller configured to identify or detect a transient engine operating condition and, in response to the transient engine operating condition, adjust the bypass valve to reduce exhaust flow through the exhaust gas treatment system. In one example, exhaust gas flow through the exhaust gas treatment device may be reduced during transient conditions by opening the valve. Thus, the exhaust gas flow may bypass the exhaust gas treatment device resulting in a decrease of thermal energy absorbed by the exhaust gas treatment device, and an increase of thermal energy available for the turbocharger. In this manner, the turbocharger may produce a greater amount of boost, which may result in a decrease in transient response. Further, by opening the valve during transient conditions, particulate matter loading in the exhaust gas treatment device may be substantially reduced during transient conditions.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include mining equipment, marine vessels, on-road transportation vehicles, off-highway vehicles (OHV), and rail vehicles. For clarity of illustration, a locomotive is provided as an example mobile platform supporting a system incorporating an embodiment of the invention.

Figure 1:
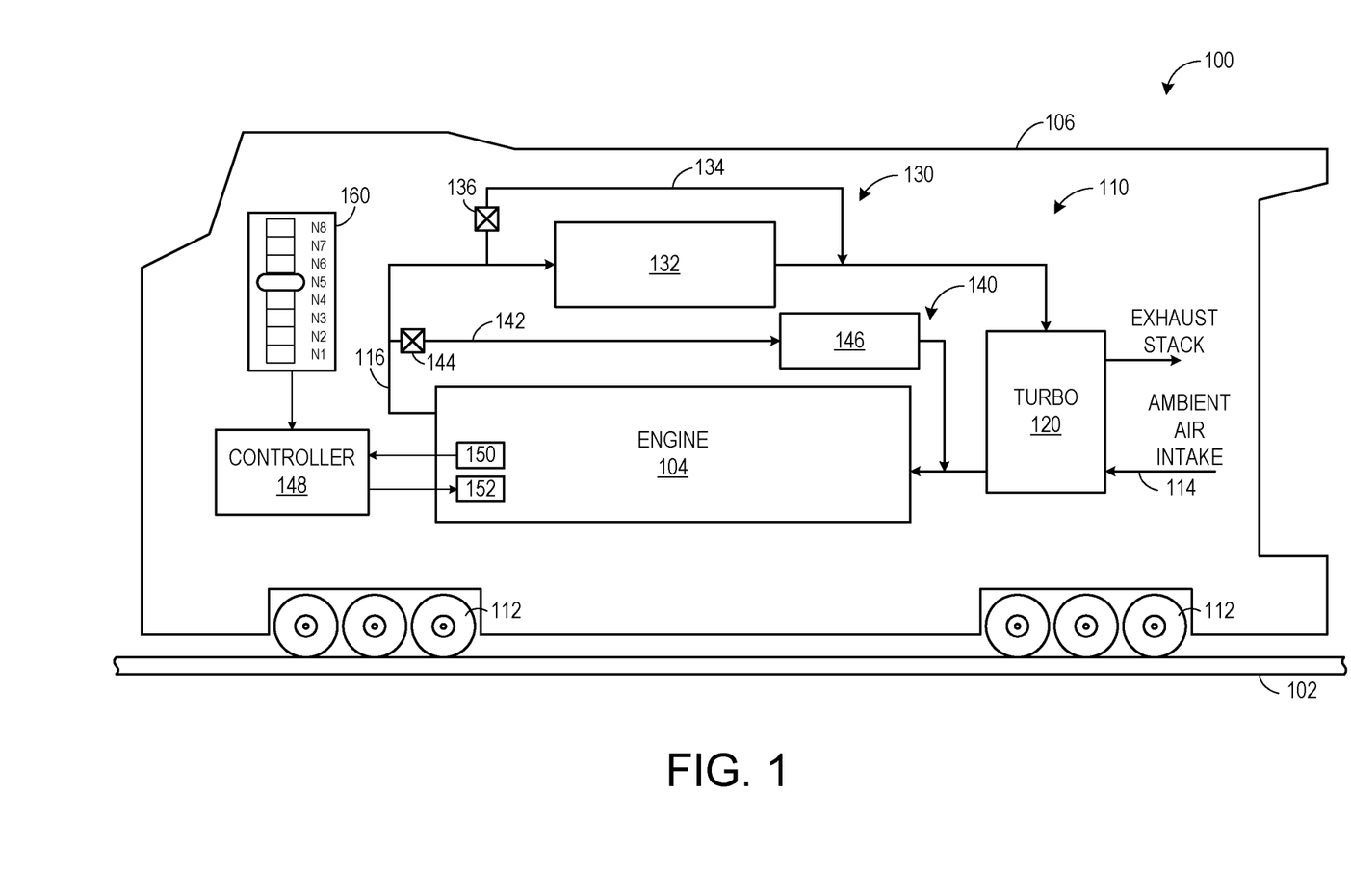
FIG. 1 shows an example embodiment of a rail vehicle with an exhaust gas treatment system with a valved bypass according to an embodiment of the invention.

Before further discussion of the exhaust gas treatment system bypass approach, an example of a vehicle system connected to a platform is disclosed in which the exhaust gas treatment system may be configured for an engine in a vehicle, such as a rail vehicle. For example, FIG. 1 shows a block diagram of an example embodiment of a vehicle system 100 (e.g., a locomotive system), herein depicted as a rail vehicle 106, configured to run on a rail 102 via a plurality of wheels 112 connected to the platform. As depicted, the rail vehicle 106 includes an engine system 110 with an engine 104, such an internal combustion engine. In other non-limiting embodiments, the engine 104 may be a stationary engine, such as in a power-plant application, or an engine in a marine vessel or OHV propulsion system.

The engine 104 receives intake air for combustion from an intake passage 114. The intake passage 114 receives ambient air from an air filter (not shown) that filters air from outside of the rail vehicle 106. Exhaust gas resulting from combustion in the engine 104 is supplied to an exhaust passage 116. Exhaust gas flows through the exhaust passage 116, and out of an exhaust stack of the rail vehicle 106. In one example, the engine 104 is a diesel engine that combusts air and diesel fuel through compression ignition. In other non-limiting embodiments, the engine 104 may combust fuel including gasoline, kerosene, biodiesel, or other petroleum distillates of similar density through compression ignition (and/or spark ignition). The engine 104 may be a V-6, V-8, V-10, V-12, V-16, I-4, I-6, I-8, opposed 4, or another engine type.

The engine system 110 includes a turbocharger 120 that is arranged between the intake passage 114 and the exhaust passage 116. The turbocharger 120 increases air charge of ambient air drawn into the intake passage 114 in order to provide greater charge density during combustion to increase power output and/or engine-operating efficiency. The turbocharger 120 may include a compressor (not shown in FIG. 1) which is at least partially driven by a turbine (not shown in FIG. 1). While in this case a single turbocharger is included, the system may include multiple turbine and/or compressor stages, such as the engine system 200 depicted in FIG. 2 which includes a two-stage turbocharger. Further, in some embodiments, a wastegate (not shown) may be provided which allows exhaust gas to bypass the turbocharger 120. The wastegate may be opened, for example, to divert the exhaust gas flow away from the turbine. In this manner, the rotating speed of the compressor, and thus the boost provided by the turbocharger 120 to the engine 104 may be regulated during steady state conditions.

The engine system 110 further includes an exhaust gas treatment system 130 disposed in the exhaust passage upstream of the turbine of the turbocharger 120. As will be described in greater detail below, the exhaust gas treatment system 130 may include one or more components. In one example embodiment, the exhaust gas treatment device 132 may include a diesel oxidation catalyst (DOC) and a particulate oxidation catalyst (POC), where the DOC is positioned upstream of the POC in the exhaust gas treatment system. In other embodiments, the exhaust gas treatment device 132 may additionally or alternatively include a diesel particulate filter, a selective catalytic reduction (SCR) catalyst, three-way catalyst, $NO_x$ trap, various other emission control devices or combinations thereof. Further, in some embodiments, one or more additional exhaust gas treatment devices may be positioned downstream of the turbocharger.

As depicted in FIG. 1, the exhaust gas treatment system 130 further includes a bypass 134 with a bypass valve 136. The bypass valve 136 may be controlled to adjust the flow of exhaust gas around the exhaust gas treatment device 132. The bypass valve 136 may be any element that can be controlled to selectively partially or completely block a passage. As an example, the bypass valve may be a gate valve, a butterfly valve, a globe valve, an adjustable flap, or the like. In one example, the bypass valve 136 is configured to be adjusted to reduce exhaust gas flow through the exhaust gas treatment system in response to a transient engine operating condition.

For example, in one embodiment, the system includes a control unit that is configured to adjust the bypass valve 136 (e.g., by generating control signals to which the valve is responsive) to reduce exhaust gas flow through the exhaust gas treatment system in response to the transient engine operating condition. In another embodiment, the bypass valve 136 is configured to self-actuate to an at least partially open position during the transient operating condition, for reducing the exhaust gas flow through the exhaust gas treatment system. (For this purpose, in such an embodiment, the valve could include a temperature-dependent actuation mechanism, such as a bi-metal member, that is responsive to a temperature associated with the transient operating condition.) In one example, the bypass valve 136 may be opened such that exhaust gas flow through the exhaust treatment device is substantially reduced during transient engine operating conditions. In another example, the bypass valve may be opened such that exhaust gas flow through the exhaust gas treatment device is substantially reduced in order to cool the exhaust gas treatment device under extreme ambient conditions (e.g., during tunneling operation in which the vehicle is travelling through a tunnel).

The engine system 110 further includes an exhaust gas recirculation (EGR) system 140, which routes exhaust gas from the exhaust passage 116 upstream of the exhaust gas treatment device 132 to the intake passage downstream of the turbocharger 120. Thus, an EGR inlet is located upstream of the exhaust gas treatment device 132. The EGR system 140 includes an EGR passage 142 and an EGR valve 144 operably disposed in the EGR passage 142 for controlling an amount of exhaust gas that is recirculated from the exhaust passage 116 of engine 104 to the intake passage 114 of engine 104. In an embodiment, the EGR valve 144 is configured to be closed during the transient engine operating condition. For example, in one embodiment, a control unit is configured to generate a control signal for controlling the EGR valve 144 to a closed position during the transient operating condition. In another embodiment, the EGR valve 144 is configured to self-actuate to a closed position during the transient operating condition, such as the valve having a temperature-dependent actuating mechanism (such as a bi-metal member) that is responsive to a temperature associated with the transient operating condition.

By introducing exhaust gas to the engine 104, the amount of available oxygen for combustion is decreased, thereby reducing the combustion flame temperatures and reducing the formation of nitrogen oxides (e.g., $NO_x$). The EGR valve 144 may be an on/off valve controlled by the controller 148, or it may control a variable amount of EGR, for example. It should be understood, the EGR valve 144 may be any element that can be controlled to selectively partially or completely block a passage. As an example, the EGR valve may be a gate valve, a butterfly valve, a globe valve, an adjustable flap, or the like. In some embodiments, as shown in FIG. 1, the EGR system 140 further includes an EGR cooler 146 to reduce the temperature of the exhaust gas before it enters the intake passage 114. As shown in the non-limiting example embodiment of FIG. 1, the EGR system 140 is a high-pressure EGR system. In other embodiments, the engine system 110 may additionally or alternatively include a low-pressure EGR system, routing EGR from downstream of the turbine to upstream of the compressor.

The rail vehicle 106 further includes a controller 148 to control various components related to the vehicle system 100. In one example, the controller 148 includes a computer control system. The controller 148 further includes computer readable storage media (not shown) including code for enabling on-board monitoring and control of rail vehicle operation. The controller 148, while overseeing control and management of the vehicle system 100, may be configured to receive signals from a variety of engine sensors 150, as further elaborated herein, in order to determine operating parameters and operating conditions, and correspondingly adjust various engine actuators 152 to control operation of the rail vehicle 106. For example, the controller 148 may receive signals from various engine sensors 150 including, but not limited to, engine speed, engine load, boost pressure, exhaust pressure, ambient pressure, exhaust temperature, notch setting, etc. Correspondingly, the controller 148 may control the vehicle system 100 by sending commands to various components such as traction motors, alternator, cylinder valves, throttle, etc.

In one example, the controller 148 may receive communication from notch sensors coupled to a notched throttle 160 indicating a power level. For example, the notched throttle 160 includes a plurality of notches, and each notch of the notched throttle 160 may correspond to a discrete power level, or power setting, indicating a fixed power and engine speed. The controller 148 may be configured to identify the change in power setting of the engine due to shift of the notched throttle from one notch to another notch, for example. Although eight notch settings are depicted in the example embodiment of FIG. 1, in other embodiments, the throttle notch may have more than eight notches or less than eight notches, as well as notches for idle and dynamic brake modes. In other embodiments, the throttle may be a continuous/analog throttle. In some embodiments, the notch setting may be selected by an operator of the rail vehicle 106. In other embodiments, the controller 148 may determine a trip plan (e.g., a trip plan may be generated using trip optimization software, such at Trip Optimizer™ available from General Electric Company) including notch settings based on engine and/or rail vehicle operating conditions and/or the ambient levels of one or more regulated emissions. In another example, the controller 148 may adjust the bypass valve 136 in response to transient engine operating conditions initiated by a shift of the notched throttle from one notch to another notch (e.g., a shift from N4 to N5). In another example, the controller 148 may be configured to selectively at least partially close the EGR valve 144 in response to a change in a power setting of the engine.

In one example embodiment, an engine system comprises a control module configured to receive a first signal relating to a transient engine operating condition and to generate a control signal in response to the first signal. For example, the control module may be hardware and/or software having functionality as indicated. Hardware and/or software refers to one or more electronic components and/or sets of machine readable instructions, stored on a non-transitory medium, that perform or cause to be performed one ore more designated functions. The control module may be a stand alone unit, or a part of a vehicle controller, such as the controller 148, or other control unit system on the vehicle. The control signal is configured for control of a bypass control element (e.g., a valve or flap) to adjust an amount of exhaust passing through and bypassed around an exhaust treatment system disposed upstream of a turbine of an engine system turbocharger.

In one example, the control module is configured to generate the control signal as configured to control the bypass control element to a closed position when the first signal is indicative of the transient engine operating condition not present. The control module is further configured to generate the control signal as configured to control the bypass control element to an at least partially open position when the first signal is indicative of the transient engine operating condition being present.

In another example, the exhaust treatment system is configured to be disposed in an exhaust passage upstream of the turbine. The exhaust treatment system comprises at least one exhaust gas treatment device and a bypass for fluidly coupling an end upstream of the at least one exhaust gas treatment device with an end downstream of the at least one exhaust gas treatment device. The exhaust gas treatment system further comprises a bypass control element, wherein the bypass control element is operably coupled with the bypass such that a position of the bypass control element governs an extent to which the bypass is open for passage of fluid.

Thus, in one embodiment, a vehicle system comprises an engine with an exhaust passage through which exhaust gas flows from the engine, a notched throttle including a plurality of notches, each of the notches corresponding to a power setting of the engine, and a turbocharger with a turbine positioned in the exhaust passage. The vehicle system further comprises an exhaust gas treatment system disposed in the exhaust passage upstream of the turbocharger, the exhaust gas treatment system including a diesel oxidation catalyst and a particulate oxidation catalyst and a bypass with a bypass valve, and a controller configured to identify a change in power setting of the engine due to a shift of the notched throttle from one notch to another notch, and in response to the change in power setting, opening the bypass valve to reduce flow through the exhaust gas treatment system.

During transient engine conditions, such as when the notched throttle is shifted from one notch to another notch (e.g., from one power setting to another power setting), the bypass valve of the exhaust gas treatment system may be opened so that the exhaust gas flow from the engine bypasses the exhaust gas treatment device. In this manner, the transient engine response may be improved, as a reduced portion of energy from the hot exhaust gas is not dissipated to the exhaust gas treatment device. Instead, the energy may be utilized by the turbocharger to increase an amount of boost, thereby increasing the pressure of the charge air delivered to the cylinders of the engine such that a time it takes the engine to speed up may be reduced.

Figure 2:
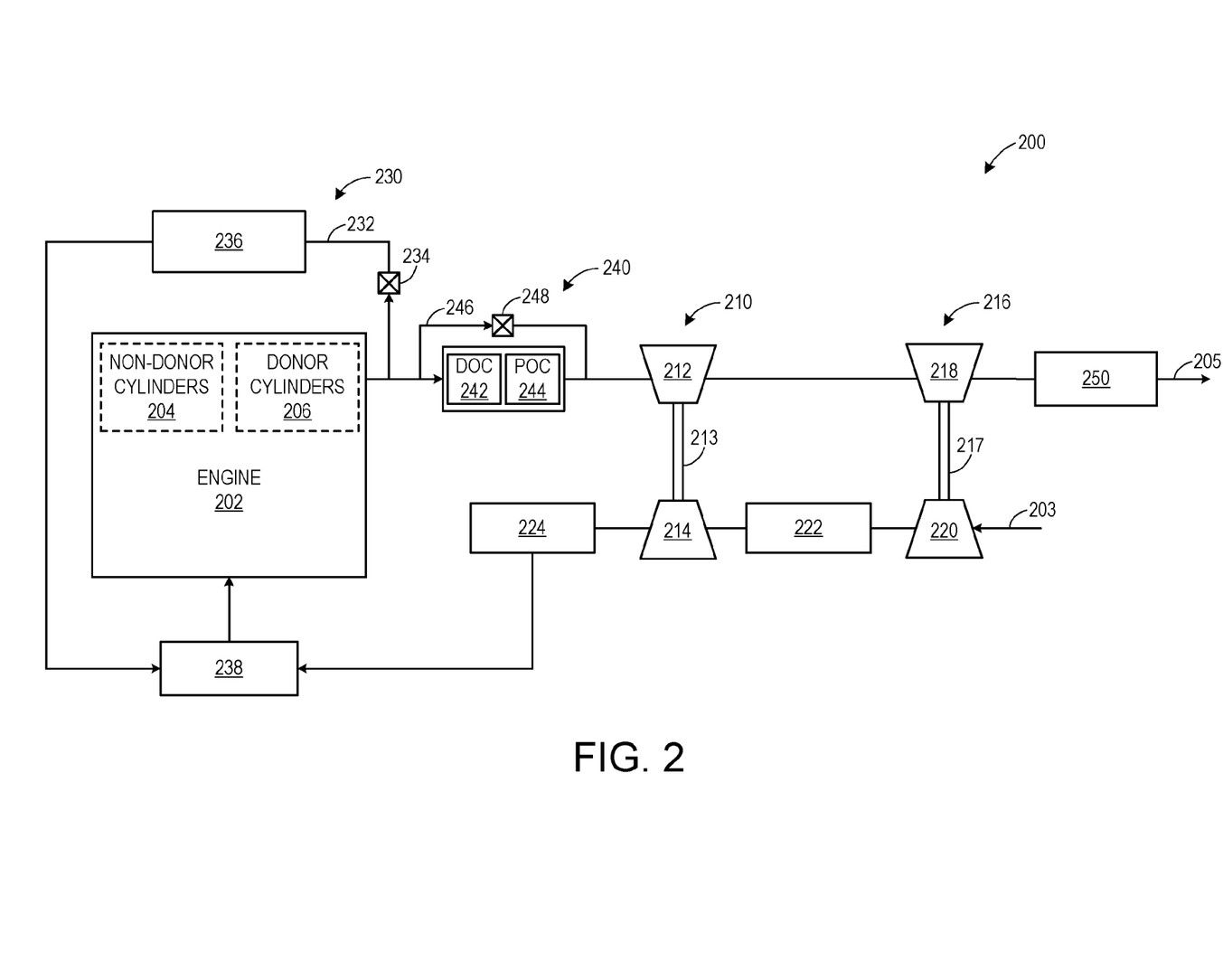
FIG. 2 shows an example embodiment of an engine system with an exhaust gas treatment system with a valved bypass.

Another example embodiment of an engine system 200 is depicted in the schematic diagram shown in FIG. 2. Similar to the engine system 110 described above with reference to FIG. 1, the engine system 200 includes an engine 202, such an internal combustion engine. In other non-limiting embodiments, the engine 202 may be a stationary engine, such as in a power-plant application, or an engine in a marine vessel or off-highway vehicle propulsion system.

The engine 202 receives intake air for combustion from an intake passage 203. The intake passage 203 receives ambient air from an air filter (not shown) that filters air from outside of the engine system 200. Exhaust gas resulting from combustion in the engine 202 is supplied to an exhaust passage 205. In one example, the engine 202 is a diesel engine that combusts air and diesel fuel through compression ignition. In other non-limiting embodiments, the engine 202 may combust fuel including gasoline, kerosene, biodiesel, or other petroleum distillates of similar density through compression ignition (and/or spark ignition). Further, in another non-limiting embodiment, the engine may utilize a combustion process such a Miller cycle in order to reduce regulated emissions, such as $NO_x$, while reducing an impact on specific fuel consumption.

The engine 202 may include any suitable number of cylinders for combustion. For example, the engine 202 may be a V-6, V-8, V-10, V-12, V-16, I-4, I-6, I-8, opposed 4, or another engine type. In some embodiments, one or more of the cylinders of the engine 202 may be donor cylinders that are dedicated to generating exhaust gas for EGR. As depicted in FIG. 2, the engine 202 may include a plurality of non-donor cylinders 204 and a plurality of donor cylinders 206.

The engine system 200 further includes a two-stage turbocharger with a first turbocharger 210 and a second turbocharger 216 arranged in series, each of the turbochargers 210 and 216 arranged between the intake passage 203 and the exhaust passage 205. The two-stage turbocharger increases air charge of ambient air drawn into the intake passage 203 in order to provide greater charge density during combustion to increase power output and/or engine-operating efficiency. The first turbocharger 210 includes a first turbine 212 which drives a first compressor 214, the first turbine 212 and the first compressor 214 mechanically coupled via a shaft 213. The second turbocharger 216 includes a second turbine 218 which drives a second compressor 220, the second turbine 218 and second compressor 220 mechanically coupled via a shaft 217. In some embodiments, each of the turbochargers 210 and 216 may be provided with a wastegate (not shown) which allow exhaust gas to bypass the turbocharger 120. One or both of the wastegates may be opened, for example, to divert the exhaust gas flow away from the turbines. In this manner, the rotating speed of one or both of the compressors, and thus the boost provided by one or both of the turbochargers 210 and 216 to the engine 202 may be regulated during steady state conditions.

As depicted in FIG. 2, an intercooler 222 is positioned in the intake passage 203 upstream of the first compressor 214 and downstream of the second compressor 220 which cools the intake air compressed by the second compressor 220 before it enters the first compressor 214. The engine system 200 further includes an aftercooler 224 positioned downstream of the first compressor 214 which cools the intake air compressed by the first compressor 214 before the intake air enters the cylinders of the engine 202.

The engine system 200 further includes an exhaust gas treatment system 240 disposed upstream of the turbine of the two-stage turbocharger in the exhaust passage. In the example embodiment depicted in FIG. 2, the exhaust gas treatment system 240 may include a diesel oxidation catalyst (DOC) and a particulate oxidation catalyst (POC), where the DOC is positioned upstream of the POC in the exhaust gas treatment system. By positioning the DOC and POC upstream of the two-stage turbocharger (e.g., in a pre-turbo location), particulate matter (e.g., soot) emission may be reduced while an impact of the exhaust gas treatment device on specific fuel consumption is reduced as compared to a post-turbo location. In other embodiments, the exhaust gas treatment device 132 may additionally or alternatively include a diesel particulate filter, a selective catalytic reduction (SCR) catalyst, three-way catalyst, $NO_x$ trap, various other emission control devices or combinations thereof.

As depicted in FIG. 2, the exhaust gas treatment system 240 further includes a bypass 246 with a bypass valve 248. The bypass valve 248 may be controlled to adjust the flow of exhaust gas around the exhaust gas treatment devices 242 and 244. The bypass valve 248 may be an on/off valve controlled by a controller, or it may control a variable amount of bypass flow. It should be understood, the bypass valve 248 may be any element that can be controlled to selectively partially or completely block a passage. As an example, the bypass valve may be a gate valve, a butterfly valve, a globe valve, an adjustable flap, or the like. As will be described in greater detail below, in one example, the bypass valve 248 may be opened such that exhaust gas flow through the exhaust treatment device is substantially reduced during transient engine operating conditions. In another example, the bypass valve may be opened such that exhaust gas flow through the exhaust gas treatment device is substantially reduced in order to cool the exhaust gas treatment device during tunneling operation, or when a temperature of the exhaust gas treatment devices exceeds a threshold.

The engine system 200 further includes an exhaust gas recirculation (EGR) system 230, which routes exhaust gas from the exhaust passage 205 upstream of the exhaust gas treatment devices 242 and 244 to the intake passage 203 downstream of the first turbocharger 210. The EGR system 230 includes an EGR passage 232 and an EGR valve 234 operably disposed in the EGR passage 232 for controlling an amount of exhaust gas that is recirculated from the exhaust passage 205 of engine 202 to the intake passage 203 of engine 104. In some embodiments, such as the non-limiting embodiment depicted in FIG. 1, the exhaust gas may be routed to an EGR mixer 238, where is it mixed with cooled and compressed intake air before it enters the engine 202. As described above, by introducing exhaust gas to the engine 202, the amount of available oxygen for combustion is decreased, thereby reducing the combustion flame temperatures and reducing the formation of nitrogen oxides (e.g., $NO_x$). The EGR valve 234 may be an on/off valve controlled by a controller, or it may control a variable amount of EGR, for example. It should be understood the EGR valve 234 may be any element that can be controlled to selectively partially or completely block a passage. As an example, the EGR valve may be a gate valve, a butterfly valve, a globe valve, an adjustable flap, or the like. In some embodiments, as shown in FIG. 1, the EGR system 140 further includes an EGR cooler 146 to reduce the temperature of the exhaust gas before it enters the EGR mixer 238. As shown in the non-limiting example embodiment of FIG. 1, the EGR system 230 is a high-pressure EGR system. In other embodiments, the engine system 200 may additionally or alternatively include a low-pressure EGR system, routing EGR from downstream of the turbine to upstream of the compressor.

The engine system further includes a muffler 250 positioned along the exhaust passage 205 downstream of the second turbocharger 216. The muffler 250 may reduce exhaust noise, for example, by absorption or through resonating chambers tuned to cause destructive interference of the sound waves.

Thus, in one embodiment, system for an engine comprises an exhaust passage through which exhaust gas flows from the engine, and a turbocharger with a turbine positioned in the exhaust passage. The system further comprises an exhaust gas treatment system disposed in the exhaust passage upstream of the turbocharger, the exhaust gas treatment system including at least one exhaust gas treatment device and a bypass with a bypass valve, the bypass valve configured to be adjusted to reduce exhaust gas flow through the exhaust gas treatment system in response to a transient engine operating condition.

In this way, the transient response of the engine may be improved, as the bypass valve of the exhaust gas treatment system may be opened during transient conditions in which a load on the engine is changing. Further, because the exhaust gas treatment system is positioned upstream of the two-stage turbocharger, specific fuel consumption may be improved while particulate matter is reduced.

Figure 3:
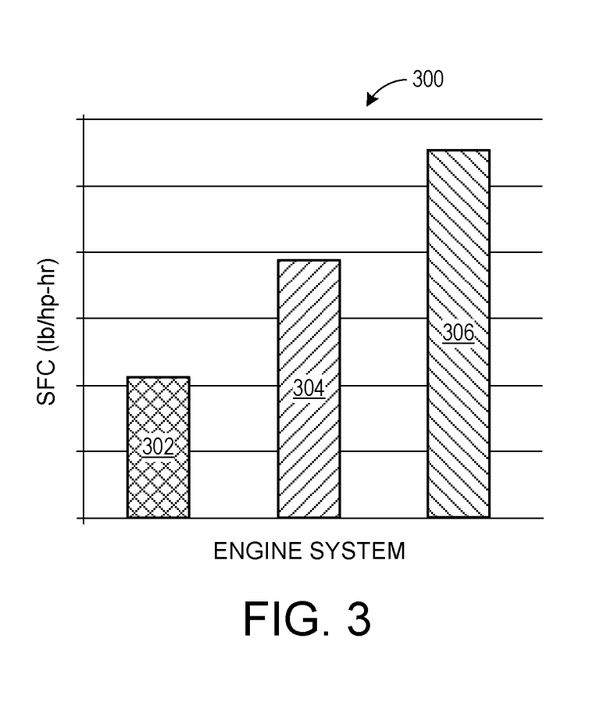
FIG. 3 shows a graph illustrating specific fuel consumption with respect to position of an exhaust gas treatment system.

FIG. 3 shows an example bar graph 300 illustrating the effect of the position of an exhaust gas treatment system in an engine system on average specific fuel consumption (SFC) during a duty cycle. As used herein, the specific fuel consumption is the rate of fuel consumption divided by power. The bar 302 of graph 300 shows a baseline specific fuel consumption. In this example, the baseline specific fuel consumption may be the average specific fuel consumption over a duty cycle, for example, in an engine system without an exhaust gas treatment system. Thus, the bar 302 shows specific fuel consumption for an engine system with no exhaust treatment system positioned upstream of a turbocharger and no exhaust gas treatment system positioned downstream of the turbocharger.

The bar 304 shows specific fuel consumption for an engine system with a pre-turbo exhaust gas treatment system. As depicted, the specific fuel consumption is higher for an engine system with an exhaust gas treatment system located upstream of the turbocharger than an engine system with no exhaust gas treatment system. The increase in specific fuel consumption may be due to a pressure drop in the exhaust passage created by the exhaust gas treatment system, for example. Because the pressure drop may induce a backpressure on the engine, the specific fuel consumption may increase.

The bar 306 shows specific fuel consumption for an engine system with a post-turbo exhaust gas treatment system. As illustrated, the specific fuel consumption is higher for an engine system with an exhaust gas treatment system positioned downstream of the turbocharger than an engine system with no exhaust gas treatment system or an exhaust gas treatment system positioned upstream of the turbocharger. The pressure drop created by the post-turbo exhaust gas treatment system may be the same as the pressure drop created by the pre-turbo exhaust gas treatment system. However, because a pressure drop downstream of the turbocharger is increased proportionally across the turbine of the turbocharger, the post-turbo exhaust gas treatment system may result in a greater backpressure on the engine and a greater specific fuel consumption.

Thus, by positioning an exhaust gas treatment system upstream of a turbocharger in an engine system, specific fuel consumption may be reduced.

An embodiment relates to a method, e.g., a method for controlling an engine system, such as the engine system 110 described above with reference to FIG. 1 or the engine system 200 described above with reference to FIG. 2. The method comprises receiving information of a changed power setting of an engine. (For example, the information may be received responsive to changing a power setting of the engine, and identifying the changed power setting.) The method further comprises adjusting a bypass valve of a bypass of an exhaust gas treatment system in response to the changed power setting. The exhaust gas treatment system is disposed upstream of a turbocharger turbine in an exhaust passage of the engine.

Figure 4:
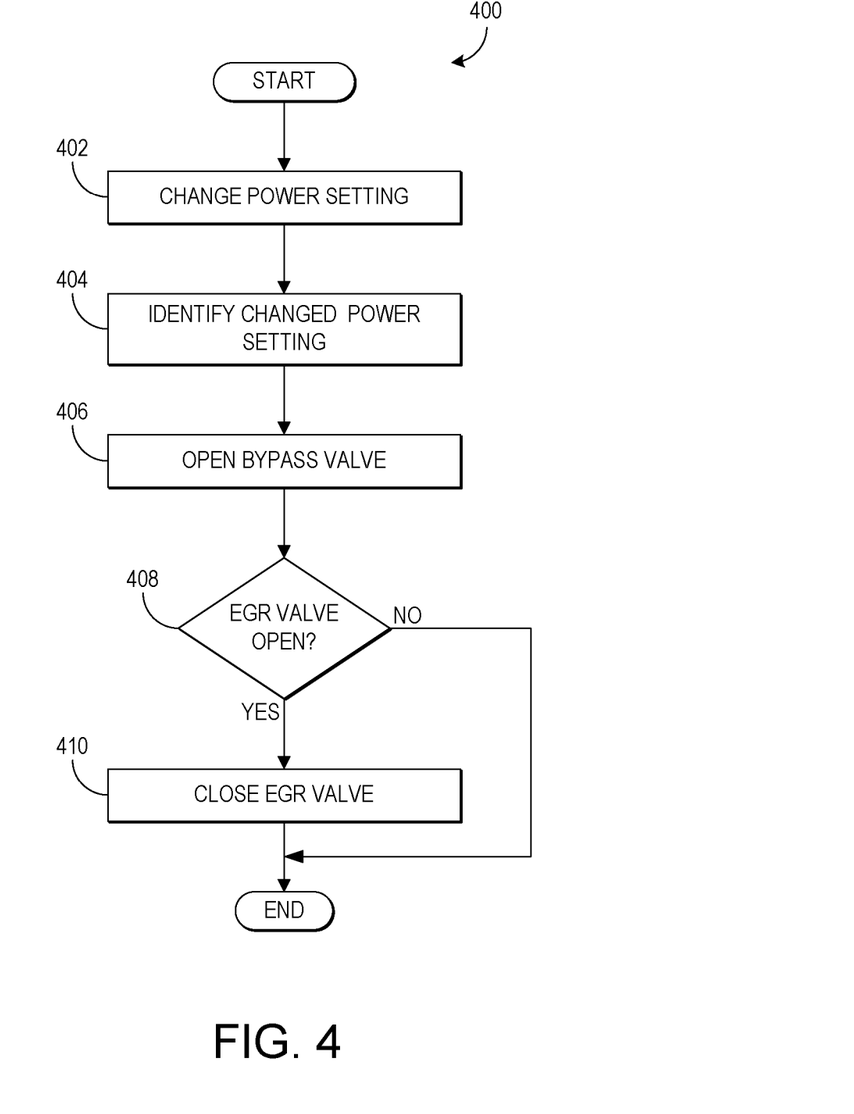
FIG. 4 shows a flow chart illustrating a method for an engine system with an exhaust gas treatment system with a valved bypass.

Referring now to FIG. 4, a flow chart illustrating a method 400 for an engine system with a pre-turbo exhaust gas treatment system with a bypass, such as the engine system 110 described above with reference to FIG. 1 or the engine system 200 described above with reference to FIG. 2, is shown. Specifically, the method 400 determines if a power setting of the engine has been changed resulting in a transient engine condition, and adjusts the bypass valve accordingly.

At 402 of method 400, a power setting is changed, thereby initiating transient engine operating conditions. As described above, the power setting may be changed when a notch of a notched throttle is shifted from a first notch corresponding to a first power setting to a second notch corresponding to a second, different power setting (e.g., from notch 7 to notch 8). As an example, the second power setting may correspond to a higher power level than the first power setting. In some examples, the power setting may be changed by an operator of the vehicle in which the engine system is positioned. In other examples, the power setting may be changed based on a trip plan, as described above.

At 404 of method 400, the changed power setting is identified. The controller may identify the notch setting based on communication from a notch sensor located on the notched throttle, for example.

At 406 of method 400, the bypass valve on the bypass around the exhaust gas treatment device is opened. By opening the bypass valve, the exhaust flow through the exhaust treatment system may be substantially reduced. In this way, an amount of energy absorbed by the exhaust gas treatment system is reduced, thereby increasing an amount of energy available to the turbocharger for boost. In some embodiments in which the turbocharger has a wastegate, the wastegate may be closed in response to the transient operating conditions. In this manner, an amount of boost generated by the turbocharger may be further increased, as substantially all the exhaust gas is passing through the turbocharger and not around the turbocharger.

Once the bypass valve is opened, method 400 proceeds to 408 where it is determined if the EGR valve is open. If it is determined that the EGR valve is closed, and exhaust gas is not entering the EGR system, the method ends. On the other hand, if it is determined that the EGR valve is open, and a portion of exhaust gas is being recirculated to the engine, method 400 continues to 410 where the EGR valve is closed. In this way, an amount of energy that is available to the turbocharger for boost is increased, as substantially all of the exhaust gas exiting the engine is passing through the turbocharger.

It should be noted, the bypass valve on the bypass around the exhaust gas treatment device may be closed when transient conditions end. For example, the bypass valve on the bypass around the exhaust gas treatment device may be closed when engine output settles to a steady state value.

Thus, during transient engine conditions, such as when the notched throttle is shifted from one power setting to another power setting, the bypass valve of the exhaust gas treatment system may be opened so that the exhaust gas flow from the engine bypasses the exhaust gas treatment device. Further, during the transient engine operating conditions, the EGR valve may be closed. In this manner, the transient engine response may be improved, as a reduced portion of energy from the hot exhaust gas is not dissipated to the exhaust gas treatment device and a portion of exhaust gas is not recirculated to the engine. Instead, substantially all of the exhaust gas flow through the turbocharger, and the energy may be utilized by the turbocharger to increase an amount of boost, thereby increasing the pressure of the charge air delivered to the cylinders of the engine such that a time it takes the engine to speed up may be reduced.

Figure 5:
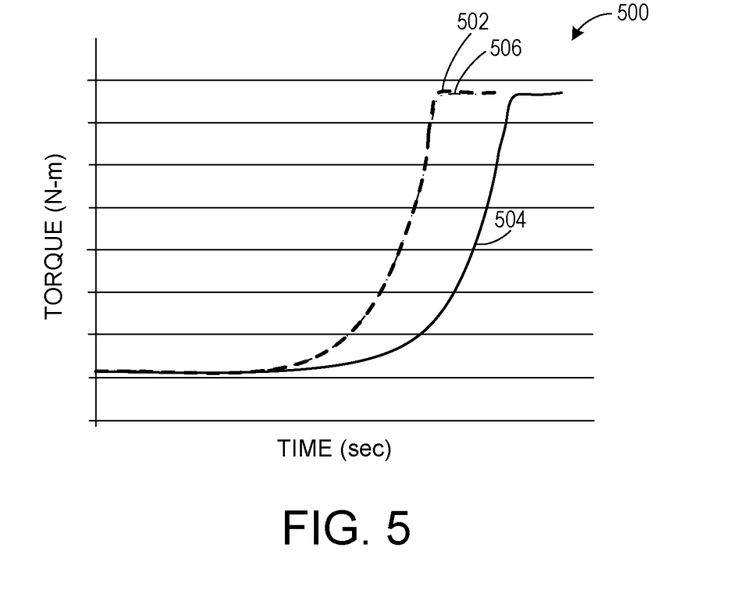
FIG. 5 shows a graph illustrating example torque curves for various engine systems.

FIG. 5 shows an example graph 500 illustrating torque over time under transient engine operating conditions for various engine systems. The curve 502 shows a baseline torque curve for an engine system without an exhaust gas treatment system (e.g., there is no exhaust gas treatment system located upstream of the turbocharger and there is no exhaust gas treatment system located downstream of the turbocharger). The curve 504 shows a torque curve for an engine system with an exhaust gas treatment system positioned upstream of the turbocharger. The curve 506 shows a torque curve for an engine system with an exhaust gas treatment system positioned upstream of the turbocharger and including a bypass valve that is opened during the transient operating conditions.

As shown by graph 500, the transient response time for an engine system without an exhaust gas treatment system and an engine system with a pre-turbo exhaust gas treatment system with a bypass valve that is opened during transient conditions is substantially the same. The torque for curves 502 and 506 increases at a similar rate. In contrast, the transient response time for an engine system with a pre-turbo exhaust gas treatment system is greater than the transient response time for an engine system without an exhaust gas treatment system and an engine system with a pre-turbo exhaust gas treatment system with a bypass valve that is opened during transient conditions.

Thus, by including a valved bypass around the pre-turbo exhaust gas treatment system, a transient response of the engine may be improved. Further, as described above, by positioning the exhaust gas treatment system upstream of the turbocharger, specific fuel consumption of the engine may be reduced during steady state conditions.

Figure 6:
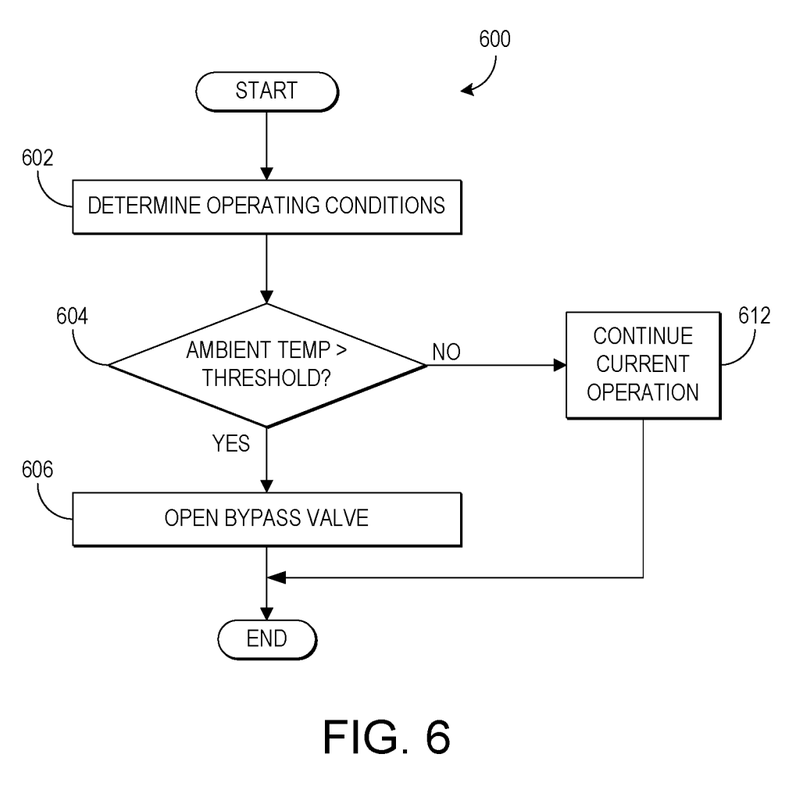
FIG. 6 shows a flow chart illustrating a method for an engine system with an exhaust gas treatment system with a valved bypass.

Continuing to FIG. 6, a method 600 for an engine system with a pre-turbo exhaust gas treatment system with a bypass, such as the engine system 110 described above with reference to FIG. 1 or the engine system 200 described above with reference to FIG. 2, is shown. Specifically, method 600 determines environmental operating conditions of the engine and adjusts the bypass valve accordingly.

At 602 of method 600, engine operating conditions are determined. Engine operating conditions may include load conditions, environmental conditions (e.g., tunneling operation, ambient temperature, ambient pressure, and the like), and the like.

Once the operating conditions are determined, method 600 proceeds to 604 where it is determined if an ambient temperature is greater than a threshold. The threshold may be a temperature related to tunneling operation or above average temperatures for a region in which the vehicle in which the engine system is positioned is travelling. If it is determined that the ambient temperature is less than the threshold, method 600 moves to 612 and current engine operation is continued. As an example, if the bypass valve is closed, the bypass valve remains closed such that the exhaust gas treatment system may continue to reduce particulate matter emissions.

On the other hand, if it is determined that the ambient temperature exceeds the threshold, method 600 continues to 606 where the bypass valve is opened. In this manner, a flow of exhaust gas through the exhaust gas treatment device may be reduced, for example, such that a temperature of the exhaust gas treatment device does not exceed a threshold above which degradation of the exhaust gas treatment device may occur.

Thus, an engine system may include a pre-turbo exhaust gas treatment system with an exhaust gas treatment device and a valved bypass. The bypass may be adjusted during various engine operation conditions. In one example, the bypass may be opened to reduce the flow of exhaust gas through the exhaust gas treatment device in order to reduce a transient response of the engine. In another example, the bypass may be opened to reduce the flow of exhaust gas through the exhaust gas treatment device in order to cool the exhaust gas treatment device. Further, by positioning the exhaust gas treatment device upstream of the turbocharger, specific fuel consumption may be reduce while particulate emissions are reduced.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A system for an engine, comprising:
an exhaust passage through which exhaust gas is configured to flow from the engine;
a turbocharger with a turbine positioned in the exhaust passage; and
an exhaust gas treatment system disposed in the exhaust passage upstream of the turbine, the exhaust gas treatment system including at least one exhaust gas treatment device and a bypass with a bypass valve, the bypass valve configured to be adjusted to reduce exhaust gas flow through the exhaust gas treatment system in response to a transient engine operating condition, the bypass valve further configured to be adjusted to reduce exhaust gas flow through the exhaust gas treatment system in response to a temperature of the exhaust gas treatment system exceeding a threshold, the at least one exhaust gas treatment device including a particulate oxidation catalyst.

2. The system of claim 1, wherein the at least one exhaust gas treatment device further includes a diesel oxidation catalyst.

3. The system of claim 1, further comprising an exhaust gas recirculation system coupled between the exhaust passage and an intake passage of the engine, the exhaust gas recirculation system including an exhaust gas recirculation passage and an exhaust gas recirculation valve, and wherein an inlet of the exhaust gas recirculation system is positioned upstream of the exhaust gas treatment system.

4. The system of claim 3, wherein the exhaust gas recirculation system is configured for the exhaust gas recirculation valve to be closed during the transient engine operating condition.

5. The system of claim 2, further comprising a control unit for adjusting the bypass valve to reduce exhaust gas flow through the exhaust gas treatment system, wherein the control unit is configured to control the bypass valve to an open position.

6. The system of claim 5, further comprising a notched throttle, the notched throttle having a plurality of notches, each notch corresponding to a different power setting of the engine, wherein the transient engine operating condition is initiated by a shift of the notched throttle from one notch to another notch.

7. The system of claim 6, wherein the engine is a diesel engine, and the engine is positioned in a rail vehicle, a marine vessel, or an off-highway vehicle.

8. The system of claim 2, further comprising a control unit for adjusting the bypass valve, wherein the control unit is configured to open the bypass valve in response to an ambient temperature exceeding a threshold.

9. A system for an engine, comprising:
a control module configured to receive a first signal relating to a transient engine operating condition and to generate a control signal in response to the first signal;
wherein the control signal is configured for control of a bypass control element to adjust an amount of exhaust passing through and bypassed around an exhaust treatment system disposed upstream of a turbine of an engine system turbocharger, the exhaust treatment system including at least one exhaust gas treatment device, the at least one exhaust gas treatment device including a diesel oxidation catalyst and a particulate oxidation catalyst; and
the control module configured to receive a second signal relating to a temperature of the exhaust treatment system and to generate a second control signal in response to the second signal, the second control signal configured for control of the bypass control element to adjust an amount of exhaust passing through and bypassed around the exhaust treatment system.

10. The system of claim 9, wherein:
the control module is configured to generate the control signal as configured to control the bypass control element to a closed position when the first signal is indicative of the transient engine operating condition not being present; and
the control module is configured to generate the control signal as configured to control the bypass control element to an at least partially open position when the first signal is indicative of the transient engine operating condition being present.

11. The system of claim 9, further comprising:
the exhaust treatment system, wherein the exhaust treatment system is configured to be disposed in an exhaust passage upstream of the turbine, and wherein the exhaust treatment system comprises:
a bypass for fluidly coupling an end upstream of the at least one exhaust gas treatment device with an end downstream of the at least one exhaust gas treatment device; and
a bypass control element, wherein the bypass control element is operably coupled with the bypass such that a position of the bypass control element governs an extent to which the bypass is open for passage of fluid.

12. A method comprising:
receiving information of a changed power setting of an engine;
adjusting a bypass valve of a bypass of an exhaust gas treatment system in response to the changed power setting, the exhaust gas treatment system disposed upstream of a turbocharger turbine in an exhaust passage of the engine, the exhaust gas treatment system including a diesel oxidation catalyst and a particulate oxidation catalyst;
adjusting the bypass valve in response to a temperature of the exhaust gas treatment system; and
adjusting the bypass valve in response to an ambient temperature.

13. The method of claim 12, further comprising changing a power setting of the engine from a first power setting, comprising a first notch of a notched throttle, to the changed power setting, the changed power setting comprising a second, different notch of the notched throttle.

14. The method of claim 12, wherein adjusting the bypass valve in response to the changed power setting includes opening the bypass valve.

15. The method of claim 12, further comprising adjusting an exhaust gas recirculation valve of an exhaust gas recirculation system coupled between a position upstream of the exhaust gas treatment system in the exhaust passage and a position in an intake passage of the engine in response to the changed power setting.

16. The method of claim 12, further comprising identifying an ambient temperature, and opening the bypass valve in response to the ambient temperature exceeding a threshold during tunneling operation.

17. A vehicle system, comprising:
an engine with an exhaust passage through which exhaust gas flows from the engine;
a throttle for controlling a power setting of the engine;
a turbocharger with a turbine positioned in the exhaust passage;
an exhaust gas treatment system disposed in the exhaust passage upstream of the turbine, the exhaust gas treatment system including a diesel oxidation catalyst and a particulate oxidation catalyst and a bypass with a bypass valve; and
a controller configured to identify a change in the power setting of the engine due to a shift of the throttle, and in response to the change in the power setting, at least partially open the bypass valve to reduce flow through the exhaust gas treatment system, the controller configured to adjust the bypass valve based on a temperature of the exhaust gas treatment system.

18. The vehicle system of claim 17, further comprising an exhaust gas recirculation system with an exhaust gas recirculation passage coupled between the exhaust passage and an intake passage of the engine, and an exhaust gas recirculation valve operably disposed in the exhaust gas recirculation passage, wherein the controller is further configured to selectively at least partially close the exhaust gas recirculation valve in response to the change in the power setting of the engine.

19. The vehicle system of claim 17, wherein the throttle is a notched throttle including a plurality of notches each corresponding to a different power setting of the engine; and wherein the controller is configured to identify the change in the power setting of the engine due to a shift of the notched throttle from one notch to another notch.

20. The vehicle system of claim 17, wherein the controller is further configured to identify an ambient temperature, and to at least partially open the bypass valve in response to the ambient temperature exceeding a threshold.

21. A locomotive or other rail vehicle comprising:
a platform;
the vehicle system of claim 17 connected to the platform; and
a plurality of wheels connected to the platform for the locomotive or other rail vehicle to move along a rail track.

* * * * *